United States Patent Office 3,424,433
Patented Jan. 28, 1969

---

3,424,433
TRAILING EDGE CONSTRUCTION IN A
RADIAL TURBINE
Herbert Hugh Langshur, St. Lambert, Quebec, Canada, assignor to United Aircraft of Canada Limited, Longueuil, Quebec, Canada
Filed Oct. 7, 1966, Ser. No. 585,013
U.S. Cl. 253—39                                            10 Claims
Int. Cl. F01d 1/06, 5/04; F04d 29/26

ABSTRACT OF THE DISCLOSURE

A rotor for a radial turbine wherein the rotor has blades with the root portion of each blade extending further axially rearwardly than the tip portion of the blade and with the trailing edge of each blade being tapered in thickness.

---

The present invention relates to the rotor construction of a radial turbine, and more particularly, to the construction of radial turbines for use in gas turbine aircraft engines.

Conventionally, such rotors are formed with blades extending outwardly from a central hub, and more usually, each blade is divided at an intermediate portion of its axial length into two portions or sections to allow for the stresses set up by the thermal gradients imposed upon the blades. The axially rearward part of the rotor from which the gases proceed axially is commonly called the exducer section of the rotor, and the rearward blade sections are referred to herein as exducer blades, although the axial division of the blades need not exactly correspond with any exact junction of leading and exducer portions of the rotor, nor does the division of the blades form a necessary part of the present invention.

Conventionally, the trailing edges of the turbine or exducer section are formed with straight radial edges. For optimum aerodynamic qualities, the blades in the exducer section should be thin, particularly near the trailing edge, but the blades are only mounted at the roots and thinning of the blade leads to undesirable stresses. The applicants have found that good aerodynamic qualities may be combined with reduced stress by extending the root portion of the blades axially rearwardly of the tip portions so as to include therebetween a generally triangular fairing and tapering this fairing axially towards the trailing edge.

Thus, in accordance with one form of the invention, there is provided in a rotor for a radial turbine having a leading portion and an exducer portion and blades forming part of the exducer portion at least, which blades extend outwardly from a root to a tip, and which terminate axially rearwardly in a trailing edge, the improvement in which the root ends of the trailing edges extend further axially rearwardly than the tip ends, so that at least a part of each trailing edge slopes between the tip and the root, at least the portion of each blade axially rearward of the tip of the trailing edge being tapered in thickness towards the trailing edge.

In accordance with another aspect of the invention, there is provided in a gas turbine aircraft engine having a radial turbine with a rotor, the rotor having a hub and separate leading and exducer blades mounted on the hub, each exducer blade having a root, a tip and a trailing edge, the improvement in which the root ends of the said trailing edges lie in a first plane which is spaced axially rearwardly of a second plane in which lie the tip ends of the trailing edges, so that at least a part of each trailing edge slopes between the tip and the root, and at least the portion of each blade axially rearward of the tip of the trailing edge being tapered in thickness towards the trailing edge.

Preferably, the root ends of the trailing edges lie in a first plane which is spaced axially rearwardly of a second plane in which lie the tip ends of the trailing edges, the tapered portions lying between such planes.

In a preferred embodiment, the trailing edges include a radially outer part disposed in a radial plane and a radially inner part which slopes rearwardly from the junction with said outer part.

The trailing edges or the sloping part thereof may lie on a geometric surface of revolution which is tapered in the direction of the roots of the blades.

The sloping edge portion may take a number of different configurations. For example, the slope may be a smooth concave curve or a straight line.

The sloping configuration of the trailing edge or portion thereof results in improved stress distribution in that an increased mounting area is presented allowing a thinner blade to be used. At the same time, the tapering in thickness or fairing of the trailing edge sloping portion presents low aerodynamic losses. These results may be achieved, in accordance with the invention, with relative ease of manufacture.

Having thus generally described the invention, a preferred embodiment thereof is hereafter more particularly described and illustrated in the accompanying drawings, in which.

Figure 1:
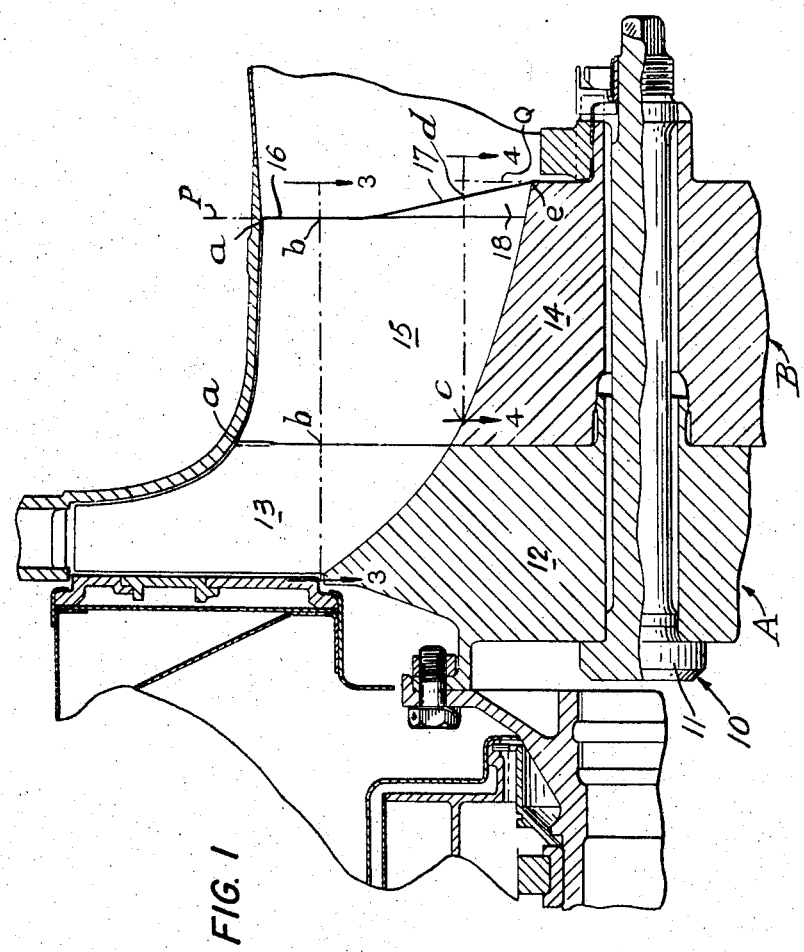
FIGURE 1 is a cross-section (not to accurate scale) along the axis of a rotor for a gas turbine aircraft engine.
Figure 2:
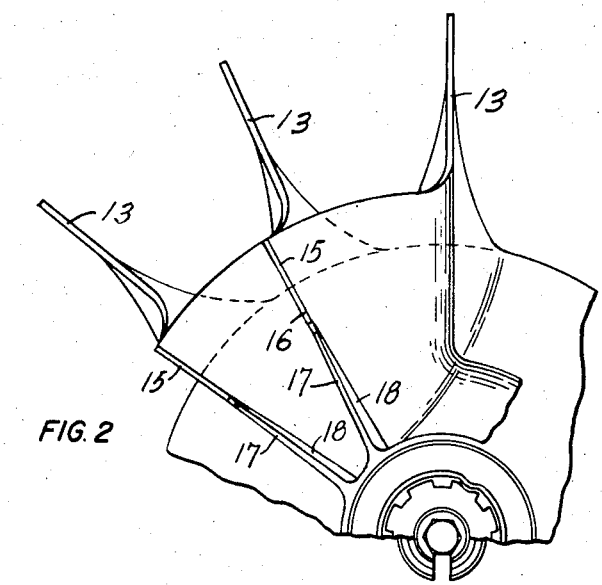
FIGURE 2 is an end view of part of the rotor of FIGURE 1, viewed from the trailing edge end of the rotor.

In the drawings, there is shown a rotor 10 divided axially into a leading section A and an exducer section B, the sections being maintained in abutment by an axial bolt 11. Leading section A has a hub portion 12 and blade portions 13 and exducer section B has a hub portion 14 and exducer blades 15.

As indicated more particularly in FIGURE 1, the trailing edge of each exducer blade 15 has a radially outer portion 16 disposed in a radial plane P and a portion 17 which slopes axially rearwardly from the junction with the portions 16 to the root of the blade, where it meets the hub portion 14. Thus, the tip ends of the trailing edges of exducer blades 15 lie in radial plane P and the root ends lie aligned in a radial plane Q which is spaced axially rearwardly of plane P.

The sloping portions 17 of the trailing edges may be said to lie in a geometric surface of revolution which tapers axially rearwardly. Although the slope of the trailing edge portions 17 has been indicated as straight in the embodiment, it would not be a departure from the invention if the portions 17 were, for example, in the shape of a concave curve.

Figure 3:
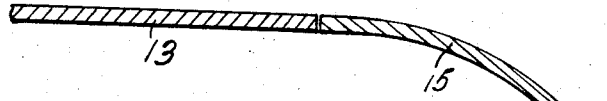
FIGURE 3 is a magnified section along the axis of one of the rotor blades, that is, along the line 3—3 of FIGURE 1.
Figure 4:
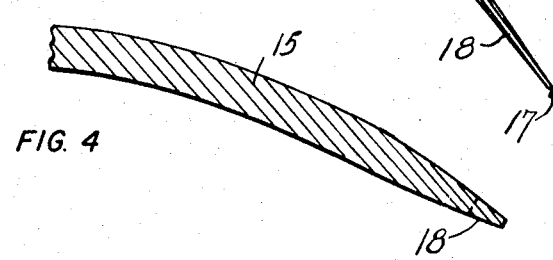
FIGURE 4 is a view similar to FIGURE 3, and on the same scale, along the line 4—4 of FIGURE 1.

As shown more particularly in FIGURES 3 and 4, the generally triangular portion 18 lying between the planes P and Q is tapered in thickness towards the trailing edge to form an aerodynamic fairing.

Both the leading and exducer blades taper (in the preferred embodiment) outwardly from the root and since the drawings do not give a precise indication of the taper, examples of the thickness of the exducer blades at point a to e of FIGURE 1 are given below:

|   | Inch |
|---|---|
| a | 0.040 |
| b | 0.045 |
| c | 0.200 |
| d | 0.050 |
| e | 0.070 |

Although the exducer blades 15 are shown the same thickness as the leading blades 13 in FIGURE 3, they may be thinner and the tolerances should be set to prevent any step-up in thickness towards the trailing edge at the junction.

By increasing the area of the blades 15 near the root and reducing them relatively towards the tip, the aerodynamic performance of the blades is substantially maintained, while the stress to which the blades are subjected is reduced, so that blades with thinner trailing edge portions and therefore with better aerodynamic performance may be used. Added performance is given by the axial taper of the root portions 18 of the blades.

Although the main parts of the blades 13 and 15 have been shown as of uniform cross-section with blades 13 slightly thicker than blades 15, they may be of the same thickness and/or tapered outwardly from the hub and/or rearwardly towards the trailing edge without departure from the present invention.

It will be appreciated that many further modifications may be made within the scope of the following claims.

I claim:

1. In a rotor for a radial turbine having a leading portion and an exducer portion and blades forming part of the exducer portion at least, which blades extend outwardly from a root to a tip, and which terminate axially rearwardly in a trailing edge, the improvement in which the root ends of the trailing edges extend further axially rearwardly than the tip ends, so that at least a part of each trailing edge slopes between the tip and the root, at least the portion of each blade axially rearward of the tip of the trailing edge being tapered in thickness towards the trailing edge.

2. The improvement of claim 1 in which the root ends of the said trailing edges lie in a first plane which is spaced axially rearwardly of a second plane in which lie the tip ends of the trailing edges, said tapered portions lying between said planes.

3. The improvement of claim 2 in which the trailing edges lie on a geometric surface of revolution which tapers axially rearwardly.

4. The improvement of claim 2 wherein the trailing edges include a radially outer part disposed in a radial plane and a radially inner part which slopes rearwardly from the junction with said outer part.

5. The improvement of claim 4 wherein said inner parts of the trailing edges lie on a geometric surface of revolution which tapers axially rearwardly.

6. The improvement of claim 5 wherein said inner parts of the trailing edges slope in a straight line.

7. The improvement of claim 2 wherein the blades taper outwardly from the roots to the tips.

8. In a gas turbine aircraft engine having a radial turbine with a rotor, the rotor having a hub and separate leading and exducer blades mounted on the hub, each exducer blade having a root, a tip and a trailing edge, the improvement in which the root ends of the said trailing edges lie in a first plane which is spaced axially rearwardly of a second plane in which lie the tip ends of the trailing edges, so that at least a part of each trailing edge slopes between the tip and the root, and at least the portion of each blade axially rearward of the tip of the trailing edge being tapered in thickness towards the trailing edge.

9. The improvement of claim 8 wherein the exducer blades taper over their whole length axially rearwardly towards the trailing edge.

10. The improvement of claim 8 wherein the exducer blades taper outwardly from the root.

References Cited

UNITED STATES PATENTS

| 2,889,107 | 6/1959 | Stalker | 230—119 |
| 3,032,315 | 5/1962 | Birmann. | |
| 3,054,554 | 9/1962 | Buchi | 253—55 X |

FOREIGN PATENTS

| 498,069 | 12/1953 | Canada. |
| 1,152,972 | 9/1957 | France |
| 838,192 | 5/1952 | Germany. |
| 907,216 | 10/1962 | Great Britain. |
| 451,063 | 8/1949 | Italy. |

EVERETTE A. POWELL, JR, *Primary Examiner.*

U.S. Cl. X.R.

230—134